(12) United States Patent
Vilar

(10) Patent No.: US 8,427,086 B2
(45) Date of Patent: Apr. 23, 2013

(54) BRAKE RESISTOR CONTROL

(75) Inventor: Zimin W. Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 466 days.

(21) Appl. No.: 12/767,191

(22) Filed: Apr. 26, 2010

(65) Prior Publication Data

US 2011/0260661 A1    Oct. 27, 2011

(51) Int. Cl.
*H02P 3/12* (2006.01)
*H02P 3/22* (2006.01)

(52) U.S. Cl.
USPC ........ 318/380; 318/366; 318/370; 180/65.21; 180/65.425

(58) Field of Classification Search .................. 318/380, 318/366, 370; 180/65.1, 65.245
See application file for complete search history.

(56) References Cited

U.S. PATENT DOCUMENTS

| | | | |
|---|---|---|---|
| 4,415,049 A | 11/1983 | Wereb | |
| 5,208,741 A | 5/1993 | Kumar | |
| 5,247,231 A | 9/1993 | Glucina | |
| 5,583,412 A | 12/1996 | Nielsen | |
| 5,831,403 A | 11/1998 | Kanki et al. | |
| 5,932,979 A | 8/1999 | Sun | |
| 6,336,364 B1 | 1/2002 | Parker et al. | |
| 6,369,538 B1 | 4/2002 | Youn et al. | |
| 6,373,789 B2 * | 4/2002 | Koike et al. .................. 368/204 |
| 6,393,911 B2 | 5/2002 | Colarelli, III et al. | |
| 6,397,971 B1 | 6/2002 | Kifuku | |
| 6,439,049 B2 | 8/2002 | Colarelli, III et al. | |
| 6,445,879 B1 | 9/2002 | Youn et al. | |
| 6,486,568 B1 | 11/2002 | King et al. | |
| 6,710,574 B2 | 3/2004 | Davis et al. | |
| 6,854,329 B2 | 2/2005 | Colarelli, III et al. | |
| 7,091,627 B2 * | 8/2006 | Turner et al. ................. 290/40 C |
| 7,304,445 B2 * | 12/2007 | Donnelly ....................... 318/108 |
| 7,330,012 B2 | 2/2008 | Ahmad et al. | |
| 2005/0028299 A1 | 2/2005 | Jeon et al. | |
| 2005/0120492 A1 | 6/2005 | Koo et al. | |
| 2005/0276020 A1 | 12/2005 | Ahmad | |
| 2006/0001318 A1 | 1/2006 | Ahmad et al. | |
| 2006/0001319 A1 | 1/2006 | Ahmad et al. | |
| 2006/0131888 A1 | 6/2006 | Ahmad et al. | |
| 2008/0129238 A1 | 6/2008 | Andersen | |
| 2009/0200969 A1 * | 8/2009 | Nagataki ....................... 318/380 |
| 2010/0013299 A1 | 1/2010 | Amler | |
| 2010/0066280 A1 * | 3/2010 | Marchand et al. ............ 318/380 |
| 2010/0186619 A1 * | 7/2010 | Kumar .......................... 104/289 |

FOREIGN PATENT DOCUMENTS

EP    1876699 A2    1/2008

OTHER PUBLICATIONS

Background Information (prior art).
How Stuff Works Article Regenerative Braking (14 pages) (prior art).
Hybrid Propulsion System (1 page) (prior art).

(Continued)

*Primary Examiner* — Erick Glass

(57) ABSTRACT

An electric drive system comprises a generator, a traction motor, a brake resistor, a bus, and a control unit. The generator, the traction motor, and the brake resistor are coupled electrically to the bus. The control unit is configured to determine a pulse-width-modulation duty cycle for the brake resistor ("brake duty") and control operation of the brake resistor according to the brake duty, wherein the brake duty can be a value intermediate of constant OFF and constant ON. A method of operating the electric drive system is also disclosed.

13 Claims, 5 Drawing Sheets

OTHER PUBLICATIONS

Hybrid Vehicle Drivetrain Article on Wikipedia (14 pages) (prior art).
MadSci Network Post (Jul. 8, 1999) (2 pages).
Modeling and Analysis of DC Link Bus Capacitor and Inductor Heating Effect on AC Drives Part I (6 pages) (Oct. 1997).
Toyota Hybrid Synergy Drive (one page) (prior art).
Toyota Technical Training Break System (8 pages) (prior art).
Background Information (2 pages) (prior art).
Official Action in counterpart Swedish Patent Application No. 1150340-6 (5 pages) (Jan. 9, 2012).
Modeling and Analysis of DC Link Bus Capacitor and Inductor Heating Effect on AC Drives Part I (6 pages) (Oct. 1997).
Official Action in counterpart Swedish Patent Application No. 1150340-6, with English translation of portions thereof (7 pages) (Jan. 9, 2012).

\* cited by examiner

U S 8,427,086 B2

1

BRAKE RESISTOR CONTROL

FIELD OF THE DISCLOSURE

The present disclosure relates to an electric drive system such as on a hybrid vehicle. In particular, the present disclosure relates to control of a brake resistor.

BACKGROUND OF THE DISCLOSURE

In some series hybrid vehicles, the vehicle has an internal combustion engine, a generator, a traction motor, a brake resistor, and a DC bus ("DC" means direct current) to which the generator, the traction motor, and the brake resistor are electrically coupled. The generator converts mechanical energy from the engine into electric energy on the bus and can operate in the opposite direction to convert electric energy from the bus into mechanical energy to assist the engine with other functions on board the vehicle (e.g., raising a bucket hydraulically). The traction motor converts electric energy from the bus into mechanical energy for use in driving one or more traction elements (e.g., ground-engaging wheels) ("motoring") and can operate in the opposite direction to convert mechanical energy into electric energy on the bus ("electric braking").

The DC bus voltage is subject to large transients introduced by transmission shifting and vehicle direction reversals (i.e., forward to reverse and reverse to forward). With respect to transmission upshifting, the motor is commanded to operate so as to decrease its speed and then increase its speed (e.g., in a V pattern) by first electric braking so as to supply electric energy to the bus and then motoring so as to remove electric energy from the bus. Transmission upshifting creates the most severe requirement on the DC bus. With respect to transmission downshifting, the motor is commanded to operate so as to increase its speed and then decrease its speed (e.g., in an inverted V pattern) by first motoring so as to remove electric energy from the bus and then electric braking so as to supply electric energy to the bus.

Regarding vehicle direction reversals, the vehicle may have a FNR control operable by the vehicle operator ("FNR" means forward, neutral, and reverse). If the FNR control is switched from forward to reverse or reverse to neutral, the motor is commanded to operate so as to decrease its speed to zero by electric braking so as to supply electric energy to the bus and then increase its speed by motoring so as to remove electric energy from the bus.

It is known for a generator controller to receive voltage readings of the DC bus voltage of the DC bus and to control the generator to try to maintain the DC bus voltage at a nominally constant voltage ("nominal DC bus voltage" or "nominal voltage") by use of closed-loop voltage control, such as PI-based voltage control ("PI" means Proportional/Integral), assisted by hysteretic control of the brake resistor. Using such prior art PI-based voltage control scheme, the generator controller operates the generator in a generating mode to convert mechanical energy into electric energy so as to supply electric energy to the DC bus, or a motoring mode to convert electric energy from the DC bus into mechanical energy so as to remove electric energy from the DC bus to assist the engine. If the rotational speed of the engine reaches a speed threshold, due, for example, to the additional energy from operation of the generator in the motoring mode, the generator controller ceases or otherwise prevents operation of the generator in the motoring mode.

Meanwhile, the DC bus voltage of the DC bus is monitored. According to the prior art hysteretic control scheme, if the DC bus voltage exceeds a DC bus threshold (e.g., due to electric braking of the motor without sufficient motoring of the generator), the brake resistor is operated in a constant ON state to dissipate electric energy from the DC bus. If the DC bus voltage is lower than the DC bus threshold, the brake resistor is in a constant OFF state.

SUMMARY OF THE DISCLOSURE

From an energy efficiency point of view, the prior art PI-based voltage control scheme assisted by hysteretic brake resistor control does not offer optimal usage of the electric brake capability during, for example, transmission shifting and quick vehicle direction reversals.

According to an aspect of the present disclosure, an electric drive system comprises a generator, a traction motor, a brake resistor, a bus, and a control unit. The generator, the traction motor, and the brake resistor are coupled electrically to the bus. The control unit is configured to determine a pulse-width-modulation duty cycle for the brake resistor ("brake duty") and control operation of the brake resistor according to the brake duty, wherein the brake duty can be a value intermediate of constant OFF and constant ON. The control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC. A method of operating the electric drive system is also disclosed.

Such a brake resistor control scheme promotes energy efficiency through optimization of brake resistor usage. It offers the opportunity to operate the brake resistor at an intermediate brake duty rather than only constant ON and constant OFF. Further, it considers the amount of power desired to be consumed. In so doing, the brake resistor control scheme may take into account an estimated power available from the bus relative to a non-zero reference power of the bus and a motor power predicted to be applied (supplied or removed) to the bus by the motor. Such predictive capability enhances the sensitivity of the brake resistor control scheme, further promoting energy efficiency.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
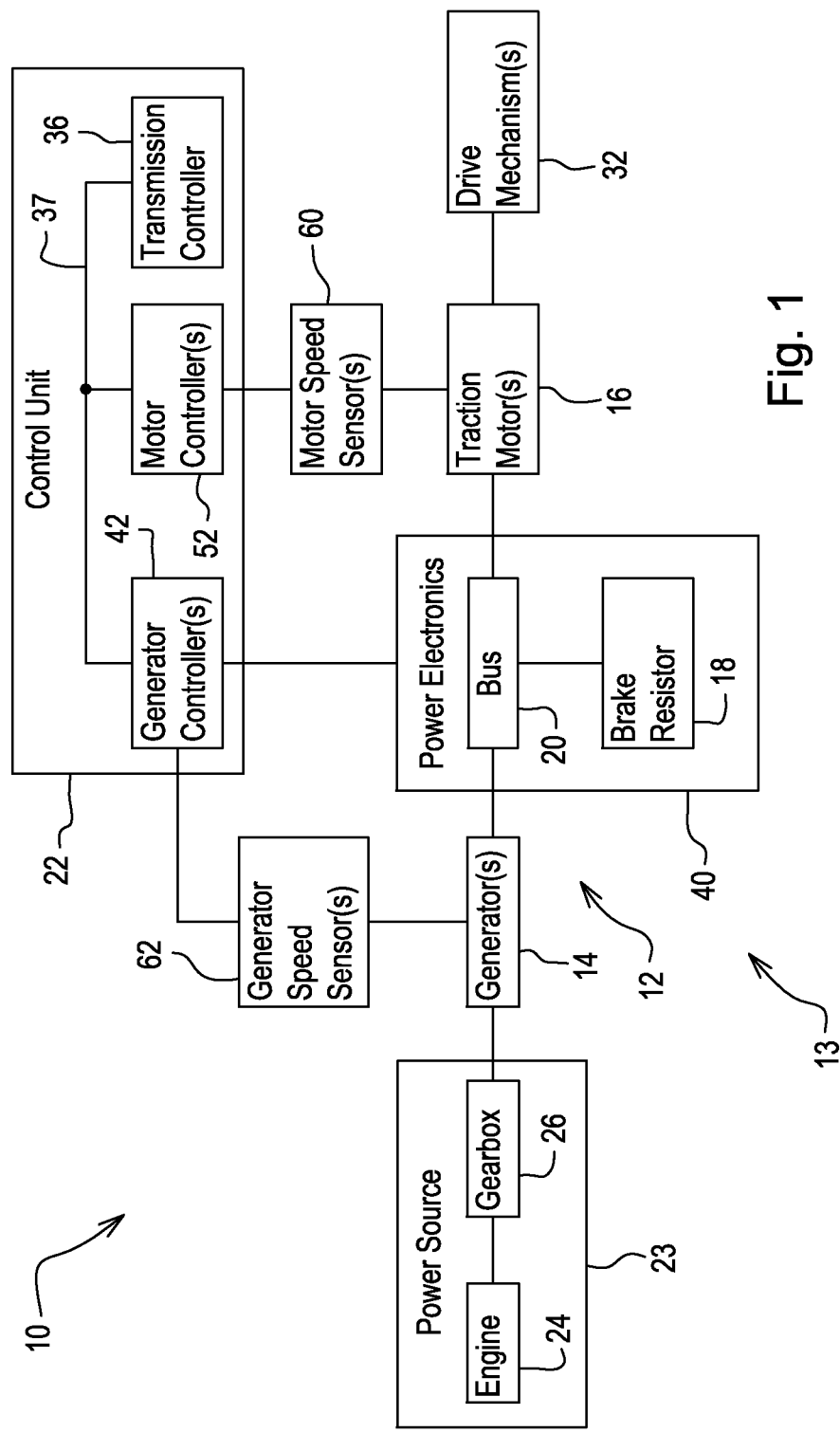
FIG. 1 is a diagrammatic view of a work vehicle having an electric drive system with a brake resistor.

Referring to FIG. 1, there is shown diagrammatically a series hybrid vehicle 10 having an electric drive system 12 of a power train 13 of the vehicle 10. The vehicle 10 may be a work vehicle (e.g., construction, forestry, agriculture, turf, to name but a few) or any other type of vehicle having an electric drive system. By way of example, the vehicle 10 may be a four-wheel drive loader having a front section and a rear section articulated to the front section, the front section having, for example, a bucket for digging and dumping material, the rear section having, for example, the operator's station and the engine compartment rearward thereof.

The electric drive system 12 has a generator 14, a traction motor 16, a brake resistor 18, a bus 20 (e.g., a DC bus), and a control unit 22. The generator 14, the traction motor 16, and the brake resistor 18 may be coupled electrically to the bus 20. The control unit 22 may be configured to determine a pulse-width-modulation (PWM) duty cycle for the brake resistor ("brake duty") and control operation of the brake resistor 18 according to the brake duty, wherein the brake duty can be a value intermediate of constant OFF and constant ON. The brake duty establishes the duration of time that the brake resistor 18 is ON with respect to the period of a brake resistor control signal that controls operation of the brake resistor. A variety of PWM schemes may be used, such as, for example, modifying the falling edge of the ON-pulse of the brake resistor control signal.

Figure 5:
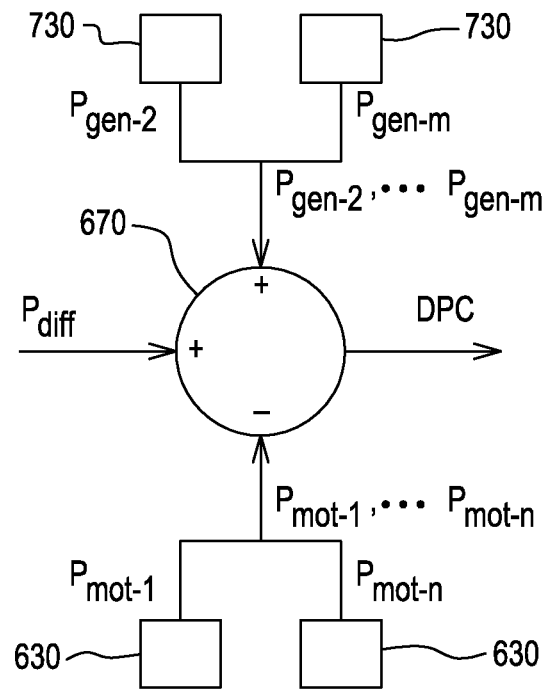
FIGS. 5 and 6 are possible modifications to the brake duty control scheme.
Figure 6:
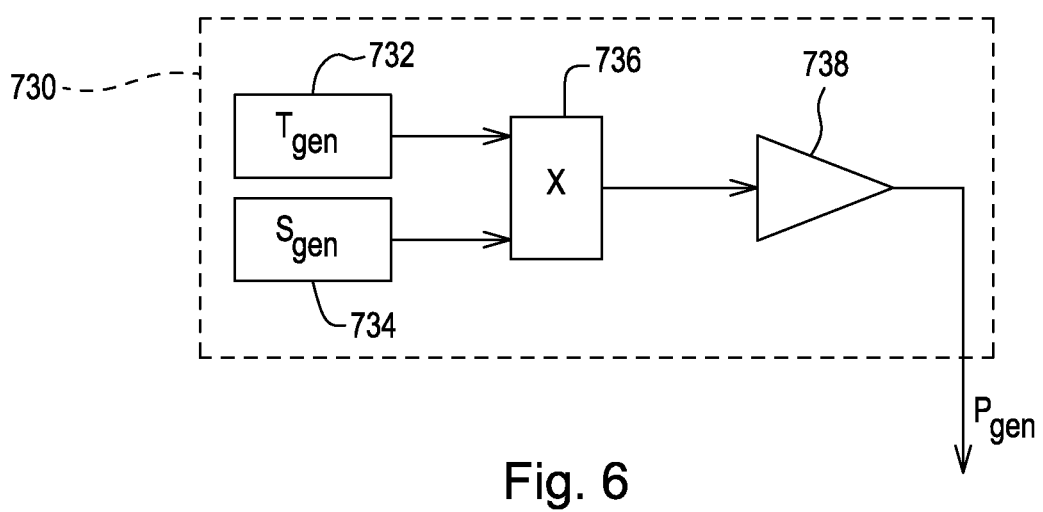

In an example of the electric drive system 12, there is only one generator 14 and only one traction motor 16, and such will be assumed until the discussion of FIGS. 5 and 6 in which multiple generators 14 or multiple motors 16 may be employed.

A power source 23 of the power train 13 may have an engine 24 configured to provide motive power for the vehicle 10. The engine 24 may be configured, for example, as diesel engine or other internal combustion engine which may operate at a generally constant speed (e.g., 1800 revolutions per minute), although the engine may experience, or be allowed to experience, some minimal speed variation due to, for example, load on the engine or mechanical energy put back on the engine by the generator 14. Collectively, the power source 23 and the electric drive system 12 may be referred to as a series hybrid-electric drive system.

The engine 24 may be coupled directly or indirectly to the generator 14 to establish a mechanical or other connection between the engine 24 and the generator 14. For example, the power source 23 may have a gearbox 26 that is coupled between the engine 24 and the generator 14 and provides an increase in speed from the engine 24 to the generator 14, allowing the generator 14 to be reduced in physical size and power (i.e., continuous load capacity), with an associated cost decrease. The volumetric size decrease of the generator 14 may be roughly inversely proportional to such speed increase. In an example, the gearbox 26 may provide a 3:1 speed increase (ratio in form of output of geargbox:input of gearbox) for the generator 14. It is within the scope of this disclosure eliminate the gearbox 26 such that the engine 24 is coupled to the generator 14 with an intermediate gearbox 26. The engine 24 (or the gearbox 26) may have a number of other outputs to operate one or more hydraulic pumps, etc. of the vehicle 10.

The generator 14 may be configured to convert mechanical energy into electric energy ("generating mode"), or to convert electric energy into mechanical energy like a motor ("motoring mode"). In the generating mode, the generator 14 is operable to convert mechanical energy from the power source 23 into electric energy to supply electric energy onto the bus 20. In the motoring mode, the generator 14 is operable to remove electric energy from the bus 20 and convert it into mechanical energy, which may be useful, for example, to assist the engine 24 with a load such as, for example, a hydraulic load (e.g., raise a bucket hydraulically). Exemplarily, the generator 14 may take the form of a high-speed three-phase interior-permanent-magnet brushless synchronous generator having three phase coils, or other suitable form.

The generator 14 may be under the control of a generator controller 42. The generator controller 42 may receive a DC bus voltage command from a transmission controller 36 via a communications bus 37 (e.g., CAN bus) commanding the generator controller 42 to control the generator 14 so as to try to maintain the voltage of the DC bus 20 at a nominally constant voltage (the nominal DC bus voltage) (e.g., 700 VDC). The generator controller 42 may receive voltage readings of the actual voltage of the bus 20 from a voltage sensor coupled electrically to the bus 20 (e.g., a voltage sensor 54 of the generator controller 42). Using closed-loop voltage control, such as PI-based voltage control, the generator controller 42 may operate the generator 14 in the generating mode or the motoring mode to try to maintain the voltage of the DC bus 20 nominally at the nominal DC bus voltage (which is the voltage setpoint for the PI-based voltage control). The generator controller 42 may determine a generator torque setpoint $\tau_{gen}$ at which to operate the generator 14 to achieve the nominal DC bus voltage (adjustments in $\tau_{gen}$ may be made, for example, to avoid generator overheating), and may command operation of the generator 14 at such setpoint.

The motor 16 may be configured to convert electrical energy into mechanical energy ("motoring mode"), or to convert mechanical energy into electric energy ("braking mode"). In the motoring mode, the motor 16 is operable to remove electric energy from the bush 20 and convert it into mechanical energy. In the braking mode, the motor 16 is operable to convert mechanical energy into electric energy so as to supply electric energy onto the bus 20 thereby braking (i.e., slowing down) the rotational speed of the motor 16 and thus the speed of the vehicle 10. Exemplarily, the motor 16 may take the form of a three-phase interior-permanent-magnet brushless synchronous motor having three phase coils, or other suitable form, which is operable at a variable speed within a speed range (negative and positive speed limit).

The motor 16 may be under the control of a motor controller 52. The motor controller 52 may receive a torque request from the transmission controller 36. The torque request may be for motoring in the motoring mode or electric braking in the braking mode. The motor controller 52 may establish a motor torque setpoint $\tau_{mot}$ at the torque request or adjust the motor torque setpoint $\tau_{mot}$ from the torque request if it determines there is a need to so (e.g., to avoid motor overheating). The motor controller 52 may thereafter command operation of the motor 16 at the motor torque setpoint $\tau_{mot}$.

The brake resistor 18 may be configured to dissipate electric energy on the bus 20 as heat. The dissipated energy may be transferred as heat from the brake resistor 18 to liquid coolant or other suitable cooling media. The brake resistor 18 may take the form of a bank of resistors having a number of discrete resistor elements that may be arranged (e.g., in series and in parallel) to provide a desired resistance and may be water-cooled (e.g., using liquid engine coolant).

Figure 2:
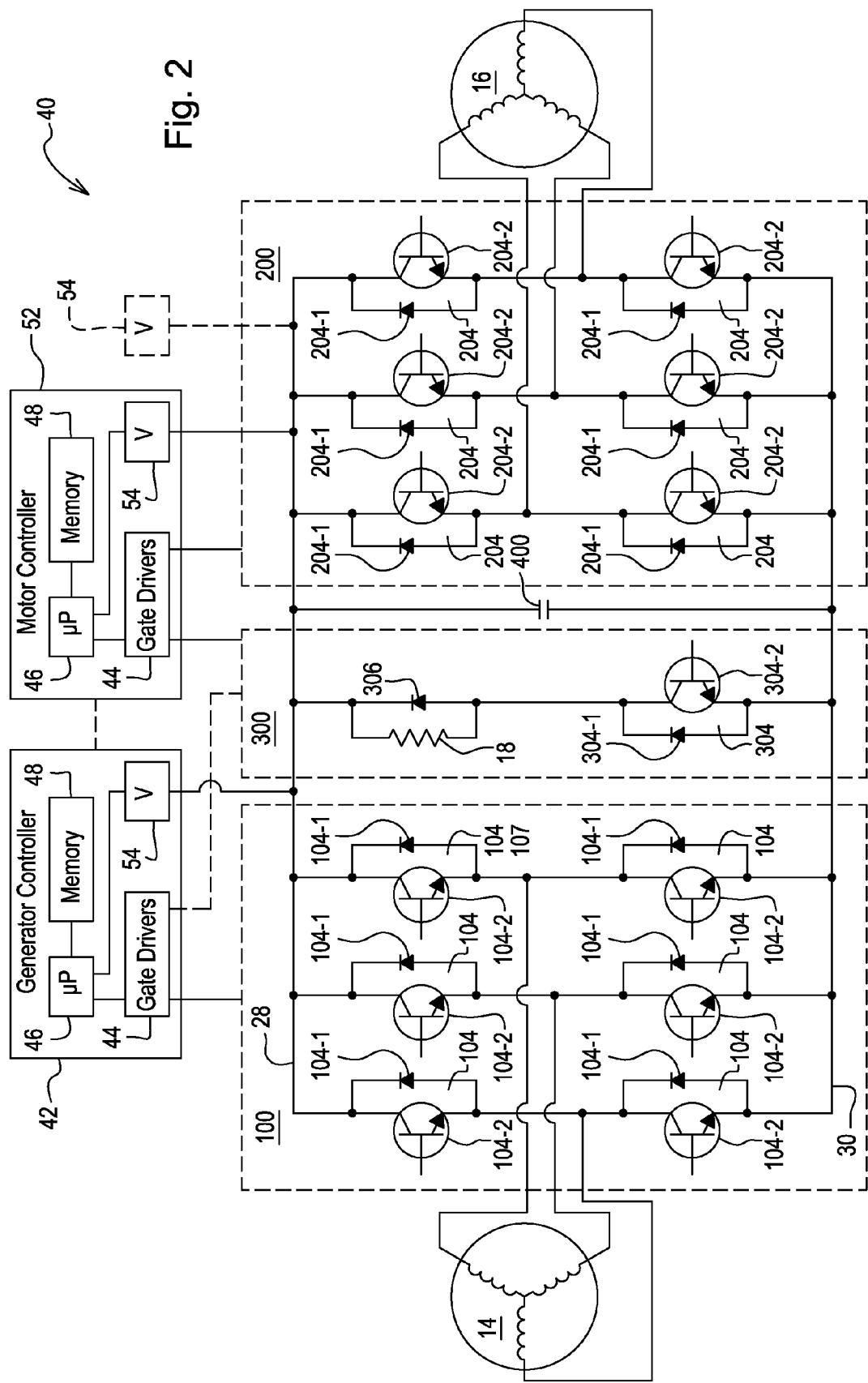
FIG. 2 is a schematic view showing an exemplary embodiment of portions of the electric drive system.

The bus 20 may be configured as a DC bus. The bus 20 may have a positive DC power rail 28 and a negative DC power rail 30 (FIG. 2). The nominal voltage of the bus 20 between the positive and negative DC power rails may be, for example, 700 Volts DC ("VDC").

The power train 13 may have a drive mechanism 32 to transmit motive power from the traction motor 16 to the ground. The drive mechanism 32 may have, for example, a multi-speed transmission 34 (e.g., three-speed transmission) under the control of a transmission controller 36 and two drive outputs. Each drive output may have an axle coupled to the transmission 34, a traction element (e.g., a wheel), and a final drive providing a fixed gear reduction between the axle and the traction element. As such, the drive mechanism 32 may provide a mechanical connection between the motor 16 and the traction elements. Exemplarily, in the case of a four-wheel drive loader, the first drive output may provide the front axle, the left and right front wheels, and the left and right front final drives of the front section of the loader, and the second output may provide the rear axle, the left and right rear wheels, and the left and right rear final drives of the rear section of the loader.

The bus 20 and the brake resistor 18 may be included in the power electronics 40 of the electric drive system 12. The power electronics 40 may be under the control of the control unit 22 which is coupled electrically to the power electronics 40, and may interconnect electrically the generator 14 and the traction motor 16. As such, the power electronics 40 under the control of the control unit 22 may be used to manage the interconnection between the generator 14 and the traction motor 16 and to control the brake resistor 18. The control unit 22 and the power electronics 40 cooperate to provide sufficient microprocessor and power semiconductor technology to monitor and regulate the attached electromechanical devices.

Referring to FIG. 2, the power electronics 40 may include a typical power converter in the form of an AC-to-DC converter to convert three-phase AC power from the generator 14 into DC power for the bus 20. The power converter may take the form of the illustrated power converter 100, and the generator 14 may be configured as a three-phase interior-permanent-magnet synchronous generator.

The power converter 100 may include six insulated gate bipolar junction transistor (IGBT) packages 104, each IGBT package 104 including a diode 104-1 and an IGBT 104-2 (which can be viewed as a switch). Respective IGBT packages 104 may be coupled to a respective one of the generator phase coils to convert AC power from that coil into DC power on the bus 20 at a nominal voltage of, for example, 700 VDC between the positive DC power rail 28 and the negative DC power rail 30. When the appropriate voltage is applied to the base of an IGBT 104-2 of the power converter 100, the switch (i.e., the IGBT) may be activated and the collector may be coupled electrically to the emitter to supply electric power. The power converter 100 may be operated in reverse if the generator 14 is to operate as a motor (e.g., to assist the engine 24 with a hydraulic load).

The power converter 100 may be under the control of a generator controller 42 of the control unit 22. The base of each IGBT 104-2 may be coupled electrically to a respective gate driver 44 of the generator controller 42 that is dedicated to that IGBT 104-2 and provides a low DC voltage to turn on and off that IGBT 104-2. Thus, there may be a gate driver 44 for each IGBT 104-2 of the power converter 100. The gate drivers 44 for the IGBTs 104-2 of the power converter 100 may be under the control of a microprocessor 46 of the generator controller 42, which may employ a pulse-width-modulation control scheme, such as one that is well-known to a person of ordinary skill in the art (e.g., space-vector modulation), to control those gate drivers 44 and the IGBTs 104-2 of the power converter 100 to supply electric energy on the bus 20 in the generating mode of the generator 14 and remove electric energy from the bus 20 in the motoring mode of the generator 14.

The power electronics 40 may include a typical power converter in the form of a DC-to-AC inverter to convert DC power into three-phase AC power for the motor 16. The power converter may take the form of the illustrated power converter 200, and the motor 16 may be configured as a three-phase interior-permanent-magnet motor having three phase coils. Electric power at a nominal voltage of, for example, 700 VDC is provided to power converter 200 by the positive and negative DC power rails 28, 30 of bus 20. The power converter 200 may include six IGBT packages 204, each IGBT package 204 including a diode 204-1 and an IGBT 204-2 (which can be viewed as a switch). Respective IGBT packages 204 may be coupled to a respective one of the motor phase coils to convert power to supply that coil. When the appropriate voltage is applied to the base of an IGBT 204-2 of the power converter 200, the switch (i.e., the IGBT) may be activated and the collector may be coupled electrically to the emitter to supply electric power. The power converter 200 may be operated in reverse if the motor 16 is to operate as a generator.

The power converter 200 may be under the control of a motor controller 52 of the control unit 22. The base of each IGBT 204-2 may be coupled electrically to a respective gate driver 44 of the motor controller 52 that is dedicated to that IGBT 204-2 and provides a low DC voltage to turn on and off that IGBT 204-2. The gate drivers 44 of the motor controller 52 may be under the control of a microprocessor 46 of the motor controller 42 which may employ a pulse-width-modulation control scheme, such as one that is well-known to a person of ordinary skill in the art (e.g., space-vector modulation), to control the gate drivers 44 of the motor controller 52, the IGBTs 204-2, and thus the motor 16 (including varying the amplitudes and frequencies to the motor coils) so as to vary the torque output of that motor 16 when the motor 16 is in its motoring mode or the electric generation capacity of the motor 16 when the motor 16 is in its braking mode.

The power electronics 40 may include a brake chopper to control use of the brake resistor 18 to dissipate electric power from the bus 20. The brake chopper may take the form of the illustrated brake chopper 300. The brake chopper 300 may include an IGBT package 304, with its diode 304-1 and IGBT 304-2, and a diode 306. The diode 306 may be in parallel with the brake resistor 18. When the appropriate voltage is applied to the base of the IGBT 304-2 of the brake chopper 300, the switch (i.e., the IGBT) may be activated and the collector may be coupled electrically to the emitter to allow dissipation of electric power through the brake resistor 18. The gate driver for the IGBT 304-2 of the brake chopper 300 issues the brake resistor control signal in the form of, for example, a pulse-width modulated voltage signal that applies the voltage to the base of the IGBT 304-2, the voltage signal being pulse-width modulated according to the brake duty to turn the brake resistor 18 ON, to dissipate electric energy from the bus 20, and OFF correspondingly.

The gate driver for the IGBT 304-2 of the brake chopper 300 may be one of the gate drivers 44 of the motor controller 52. Such gate driver 44 for the IGBT 304-2 may be under the control of the microprocessor 46 of the motor controller 52 to control that gate driver 44, the IGBT 304-2, and the brake resistor 18.

It is contemplated that, in other embodiments, the gate driver for the IGBT 304-2 may be one of the gate drivers 44 of the generator controller 42. In such a case, that gate driver 44 may be under the control of the microprocessor 46 of the generator controller 42 to control that gate driver 44, the IGBT 304-2, and the brake resistor 18.

A DC link capacitor 400 (e.g., 700 VDC) may be provided between the power rails 28, 30. The capacitor 400 may be configured, for example, as a bank of capacitors.

The electric drive system 12 may have one or more voltage sensors each coupled electrically across the rails 28, 30 to sense the actual bus voltage ($V_{bus}$). Such voltage sensors may be stand-alone voltage sensors or may be included in any of the controllers 42, 52 of the control unit 22. For example, one or both of the controllers 42, 52 may have a voltage sensor 54 coupled electrically across the rails 28, 30 to sense the actual bus voltage ($V_{bus}$). Illustratively, each controller 42, 52 has such a voltage sensor 54, which may be included in the respective controller 42, 52 (i.e., on the control board of that controller). Alternatively, one or both voltage sensors 54 may each be a stand-alone voltage sensor, so as to have a single stand-alone voltage sensor 54 or two separate such sensors, as indicated by the phantom stand-alone voltage sensor 54 in FIG. 2.

If excess voltage is on the bus 20 as detected by a voltage sensor (e.g., the voltage sensor 54 of the generator controller 42) due, for example, to electric braking of the motor 16, the generator controller 42 may, per its closed-loop voltage control scheme (e.g., PI-based voltage control), as a matter of priority seek to put the associated excess energy on the power source 23 to assist the engine 24 with a hydraulic load (e.g., raise a bucket hydraulically) or other load by operating the generator 14 in its motoring mode so as to convert electric energy from the bus 20 into mechanical energy. If the rotational speed of the engine 24 ("engine speed") reaches a speed threshold, due, for example, to the energy put on the power source 23 by motoring of the generator 14, the generator controller 42 may cease or otherwise prevent operation of the generator 14 in the motoring mode, which may tend to cause a rise in the bus voltage and associated electric energy on the bus 20 upon continued electric braking of the motor 16, the brake resistor 18 being operable according to a brake resistor control scheme to dissipate such excess electric energy.

The rotational speed of the engine 24 may be indicated by use of a generator speed sensor 62 coupled electrically to the generator controller 42 and positioned to sense the rotational speed of the shaft of the generator 14, such generator speed being indicative of the engine speed. It is contemplated that the speed sensor could be positioned in other locations to sense a speed indicative of the rotational speed of the engine 24 (e.g., output shaft of the engine 24).

Figure 3:
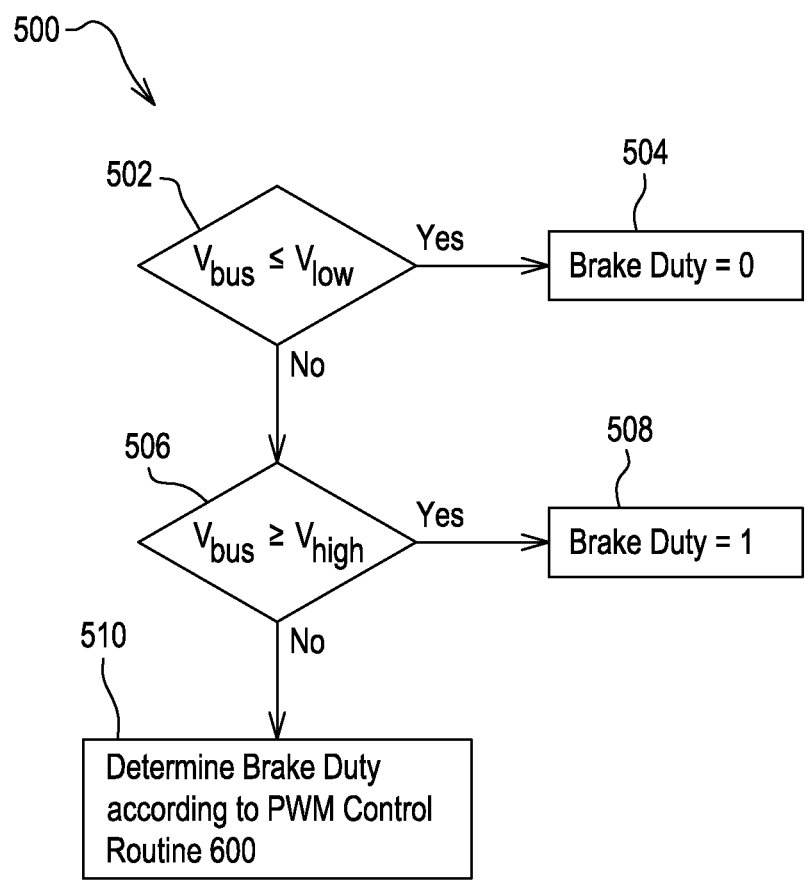
FIG. 3 is a flow chart of a portion of a brake duty control scheme.

The control unit 22 may be configured to perform a brake resistor control scheme. The control unit 22 may be configured to control operation of the brake resistor 18 according to the brake resistor control scheme to dissipate excess electric energy (actual or anticipated) from the bus 20. A hysteretic portion of the brake resistor control scheme is shown in FIG. 3 as hysteretic control scheme 500. A pulse-width-modulation portion of the brake resistor control scheme is shown in FIG. 4 as PWM control scheme 600.

Referring to FIG. 3, according to the hysteretic control scheme 500, the control unit 22 may continuously monitor the actual voltage of the bus 20 ("actual bus voltage" or "$V_{bus}$"). The control unit 22 may perform the hysteretic control scheme 500 such that the brake duty is constant OFF if the actual bus voltage is less than a predetermined lower bus voltage ("$V_{low}$"), constant ON if the actual bus voltage is greater than a predetermined upper bus voltage ("$V_{high}$"), and intermediate constant OFF and constant ON if the actual bus voltage is between the predetermined lower bus voltage and the predetermined upper bus voltage. The actual bus voltage may elevate upon electric braking of the motor 16 without sufficient motoring of the generator 14, which may occur, for example, during transmission shifting (e.g., especially upshifting) and vehicle direction reversals. The actual bus voltage may be effectively continuously (e.g., in digital sampling format) monitored by one of the voltage sensors 54, such as the voltage sensor 54 of the motor controller 52 or of the generator controller 42 or a stand-alone voltage sensor.

Exemplarily, in step 502, the control unit 22 determines if the actual bus voltage is less than or equal to the predetermined lower bus voltage. If yes, at step 504, the control unit 22 determines that the brake duty is 0, i.e., constant OFF. If no, the routine 500 advances to step 506. In step 506, the control unit 22 determines if the actual bus voltage is greater than or equal to the predetermined upper bus voltage. If yes, at step 508, the control unit 22 determines that the brake duty is 1, i.e., constant ON. If no, at step 510, the control unit 22 performs PWM control scheme 600 to determine the brake duty according to the PWM control scheme 600.

Figure 4:
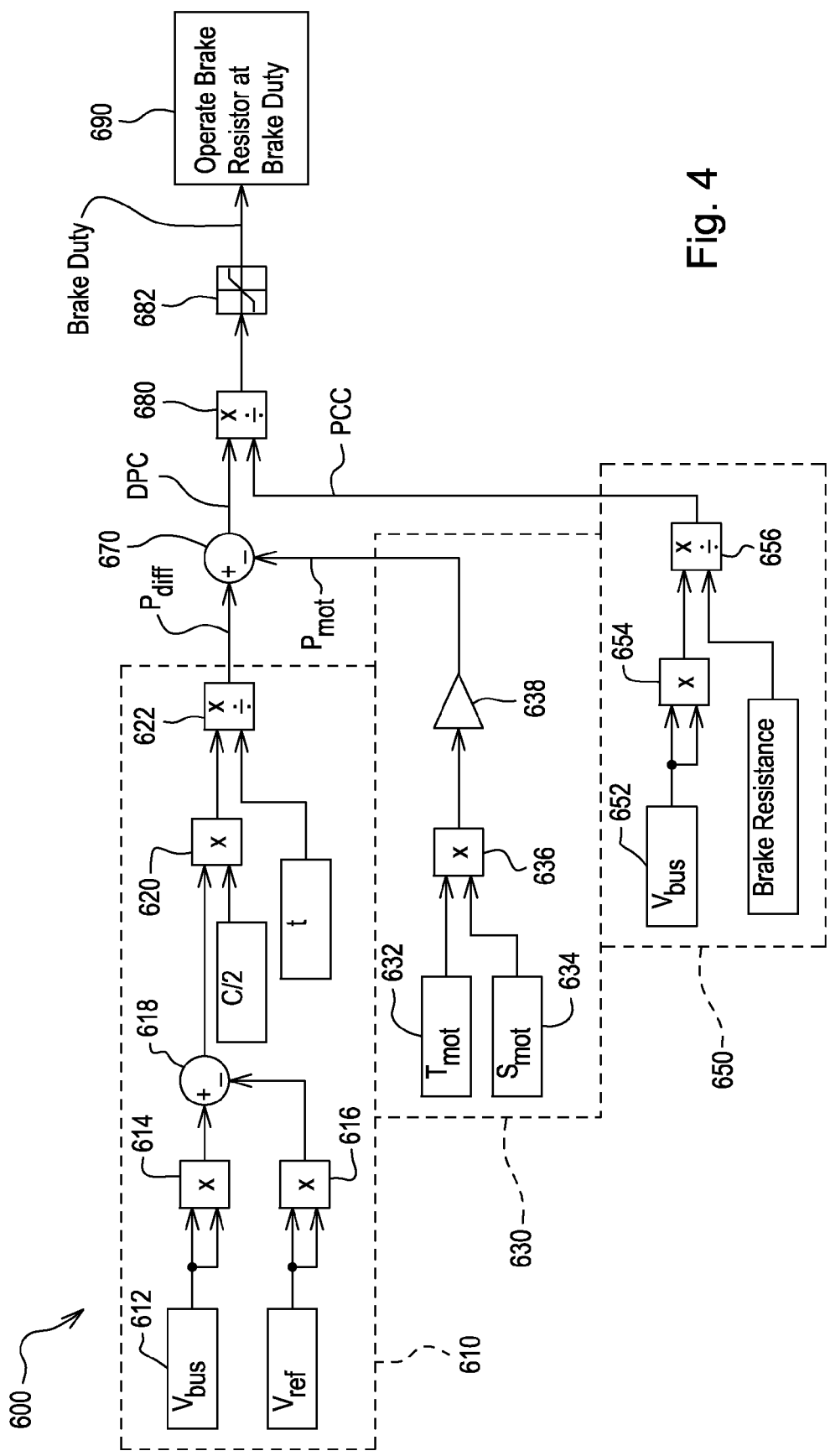
FIG. 4 is a flow chart of another portion of the brake duty control scheme.

Referring to FIG. 4, the control unit 22 may perform the PWM control scheme 600. In the control scheme 600, the control unit 22 may determine the brake duty dependent on an amount of power desired to be consumed by the brake resistor 18 ("desired power consumption" or "DPC") and a power consumption capacity of the brake resistor 18 ("PCC"). The control unit 22 may calculate the brake duty according to the equation: brake duty=DPC/PCC. The control unit 22 may determine the desired power consumption dependent on 1) a difference ("power difference" or "$P_{diff}$") between an estimated power available from the bus 20 and a non-zero reference power of the bus 20 (the power difference may thus be thought of as an estimated power available from the bus 20 relative to a non-zero reference power of the bus 20), and 2) a motor power predicted to be applied to the bus 20 by the traction motor 16 ("predicted motor power" or "$P_{mot}$"). The control unit 22 may calculate the desired power consumption DPC according to the equation: DPC=$P_{diff}$-$P_{mot}$. The control unit 22 may determine the power difference, the predicted motor power, and the power consumption capacity in sections 610, 630, and 650 of the routine 600, respectively.

In the power difference section 610 of the routine 600, the control unit 22 may calculate the power difference according to the equation: $P_{diff}$=[($V_{bus}^2$-$V_{ref}^2$)(C/2)]/t, wherein "$V_{bus}$" is the actual bus voltage of the bus 20 (such as from the voltage sensor 54 of the motor controller 52 or of the generator controller 42, or the voltage sensor 54 may be a stand-alone voltage sensor); "$V_{ref}$" is a non-zero reference voltage of the bus 20, such as, for example, the nominal voltage of the bus 20 (e.g., 700 VDC) ($V_{ref}$ may be constant or variable); "C" is the capacitance of the DC link capacitor 400; and "t" is a time value. The control unit 22 may receive from the applicable voltage sensor 54 or other voltage sensor the actual bus voltage $V_{bus}$ in step 612 and square that value in step 614. The control unit 22 may square the reference voltage $V_{ref}$ in step 616. In step 618, the control unit 22 may subtract the squared reference voltage $V_{ref}^2$ from the squared actual bus voltage $V_{bus}^2$. In step 620, this difference may be multiplied by half of the capacitance of the DC link capacitor 400 to provide the numerator of $P_{diff}$. In step 622, the numerator of $P_{diff}$ may be divided by the time value t, yielding the power difference $P_{diff}$.

Qualitatively, the numerator of $P_{diff}$ may be the difference between the electric energy on the bus 20 [($V_{bus}^2$)(C/2)] and a reference energy level [($V_{ref}^2$)(C/2)]. It thus may be referred to as the "energy difference" and may represent an electric energy surplus on the bus 20 if the energy difference is positive or an electric energy deficit on the bus 20 if the energy difference is negative. Division of the energy difference by the time value t yields the power difference $P_{diff}$.

The time value t may be determined by the designer and programmed into the routine 600. An upper limit of the time value t may be dependent on how fast the actual voltage of the bus 20 can rise from its nominal voltage to an upper hardware voltage limit, such as, for example, the upper voltage limit of the DC link capacitor 400 (e.g., 900 VDC). The upper limit then may be a function of how fast the hardware can react and the task rate of the brake resistor control scheme on the controller(s) performing the brake resistor control scheme (generator controller 42 or motor controller 52 or both, as discussed in more detail below). A lower limit of the time value t may be dependent on the size of the brake resistor 18, in particular, the power rating of the brake resistor 18. The time value t may thus be selected by the designer to be between the upper and lower time limits.

In the predicted motor power section 630 of the routine 600, the control unit 22 may determine the predicted motor power $P_{mot}$ dependent on the motor torque setpoint ($\tau_{mot}$) at which the motor 16 is commanded to operate by the control unit 22, an actual speed of the shaft of the motor 16 ("actual motor speed" or "$s_{mot}$"), and an efficiency ($\eta_{mot}$) (which may be referred to as "gain") at which the motor 16 converts mechanical energy into electric energy. The control unit 22 may calculate the predicted motor torque $P_{mot}$ according to the equation: $P_{mot}=(\tau_{mot})(s_{mot})(\eta mot)$. Regarding the sign convention which may be used in the above-mentioned equation for $P_{mot}$, the motor torque setpoint $\tau_{mot}$ may be positive in the motoring mode and negative in the braking mode.

In step 632, the control unit 22 may determine the motor torque setpoint $\tau_{mot}$. As discussed above, the motor controller 52 may receive a torque request from the transmission controller 36 and adjust the torque request if needed to arrive at the motor torque setpoint $\tau_{mot}$.

In step 634, the control unit 22 may receive the rotational speed of the shaft of the motor 16 or an indication thereof ("$S_{mot}$"). A motor speed sensor 60 may be positioned to sense $s_{mot}$ and may be coupled electrically to the motor controller 52 to provide such information thereto. In step 636, the control unit 22 may multiply the motor torque setpoint $\tau_{mot}$ and the motor speed $s_{mot}$. In step 638, this product may be multiplied by the efficiency $\eta_{mot}$, resulting in the predicted motor power $P_{mot}$.

In the power consumption capacity section 650 of the routine 600, the control unit 22 may determine the power consumption capacity PCC of the brake resistor 18 dependent on the actual bus voltage $V_{bus}$ and the resistance of the brake resistor ("R"). In step 652, the control unit 22 may receive the actual bus voltage $V_{bus}$ from the applicable voltage sensor 54 (of the motor controller 52 or the generator controller 42) or other voltage sensor. In step 654, the control unit 22 may square the actual bus voltage $V_{bus}$. Using this squared voltage and the resistance R (which is a known characteristic of the resistor 18), in step 656, the control unit 22 may calculate the power consumption PCC capacity according to the equation: $PCC=V_{bus}^2/R$.

After calculating the power difference $P_{diff}$ and the predicted motor power $P_{mot}$, the control scheme 600 may advance to step 670. In step 670, the control unit 22 may determine the desired power consumption DPC dependent on the power difference $P_{diff}$ and the predicted motor power $P_{mot}$. The control unit 22 may calculate the desired power consumption DPC according to the equation: $DPC=P_{diff}-P_{mot}$. The desired power consumption DPC may thus take into account the difference between the estimated power available from the bus 20 and the reference bus power as well as the motor power predicted to be applied to the bus 20 (i.e., supplied to or removed from the bus 20) by the motor 16. The desired power consumption DPC may thus be characterized as the power difference $P_{diff}$ modified by how much power is predicted to be removed from or supplied to the bus 20 by the motor 16 $P_{mot}$. As such, the desired power consumption DPC may be thought of as a predicted power difference.

For example, if the power difference $P_{diff}$ is positive (indicating an excess power available from the bus 20) and the motor 16 is commanded to operate in the motoring mode so as to remove power from the bus 20 (positive predicted motor power $P_{mot}$), the amount of power predicted to be removed from the bus 20 by the motor 16 ($P_{mot}$) may counter-balance the excess power resulting in a 0 brake duty, or may be insufficient to counter-balance the excess power resulting in an appropriate brake duty to manage the excess power. If the power difference $P_{diff}$ is positive (indicating an excess power estimated available from the bus 20) but the motor 16 is commanded to operate in the braking mode so as to supply power to the bus 20 (negative predicted motor power $P_{mot}$), the amount of power predicted to be supplied to the bus 20 by the motor 16 ($P_{mot}$) would increase the excess power even more resulting in an appropriate brake duty to manage the excess power.

If the power difference $P_{diff}$ is negative (indicating that the estimated power available from the bus 20 is less than the reference bus power by a deficit power) and the motor 16 is commanded to operate in the motoring mode so as to remove power from the bus 20 (positive predicted motor power $P_{mot}$), the amount of power predicted to be removed from the bus 20 by the motor 16 ($P_{mot}$) would increase the deficit power even more, resulting in a 0 brake duty. If the power difference $P_{diff}$ is negative (indicating a deficit power) but the motor 16 is commanded to operate in the braking mode so as to supply power to the bus 20 (negative predicted motor power $P_{mot}$), the amount of power predicted to be supplied to the bus 20 by the motor 16 ($P_{mot}$) may counter-balance the deficit power resulting in a 0 brake duty, or may be sufficient to produce an excess power resulting in an appropriate brake duty to manage the excess power.

After calculating the desired power consumption DPC and the power consumption capacity PCC, the control scheme 600 may advance to step 680. In step 680, the control unit 22 may determine the brake duty ("BD") dependent upon the desired power consumption DPC and the power consumption capacity PCC. The control unit 22 may calculate the brake duty according to the equation: $BD=DPC/PCC$. In step 682 (saturation block), the control unit 22 may determine that brake duty is 0 if the brake duty calculated in step 680 is less than zero, and may determine that the brake duty is 1 if the brake duty calculated in step 680 is greater than 1.

Using the thus determined brake duty, the control scheme 600 advances to step 690. In step 690, the control unit 22 commands operation of the brake resistor 18 according to the brake duty, in order to dissipate excess electric energy from the bus 20. The control unit 22 ceases brake resistor operation when the condition for brake duty=0 is met, i.e., when $V_{bus}$ is less than or equal to $V_{low}$.

As mentioned above, the electric drive system 12 may have a control unit 22. The control unit 22 may include one or more controllers to perform the various functions of the control unit 22. For example, in the case of a single generator 14 and a single motor 16, the control unit 22 may have a generator controller 42 for the generator 14 and a motor controller 52 for the motor 16.

In a first example of the control unit 22, the motor controller 52 and its voltage sensor 54 may perform the brake duty control scheme (i.e., the hysteretic control scheme 500 and the PWM control scheme 600). In such a case, the motor controller 52 may be coupled electrically to the IGBT 304-2 of the brake chopper 300 for control of the brake chopper 30 and the brake resistor 18 thereof, as indicated in FIG. 2 by the solid line between the motor controller 52 and the brake chopper 300.

In a second example of the control unit 22, the generator controller 42 and its voltage sensor 54 may perform the brake duty control scheme except for the predicted motor power section 630 which may be performed by the motor controller 52. In such a case, the generator controller 42 may be coupled electrically to the IGBT 304-2 of the brake chopper 300 for control of the brake chopper 30 and the brake resistor 18 thereof, as indicated in FIG. 2 by the dashed line between the generator controller 42 and the brake chopper 300.

In either example of the control unit 22, the controllers 42, 52 may be coupled electrically to a communication bus (e.g., CAN bus) along with the transmission controller 36. In addition, in either example, such as in the second example, there may be a high-speed communication interface (e.g., 500 kbaud CAN bus) just between the generator and motor controllers 42, 52, as indicated by the dashed line therebetween in FIG. 2, allowing communication between the controllers 42, 52. In this way, even though the generator controller 42 may have direct control over the brake chopper 300 and the brake resistor 18 thereof, the motor controller 52 may exercise control over the brake chopper 300 and the brake resistor 18 thereof via the generator controller 42. On the other hand, the motor controller 52 may be coupled electrically to the brake chopper 300 so as to have direct control over the brake chopper 300 and the brake resistor 18 thereof, and the generator controller 42 may exercise control over the brake chopper 300 and the brake resistor 18 thereof via the motor controller 52.

It is to be understood that other controller layouts may be used for the control unit 22. For example, the controllers 42, 52 (and even the transmission controller 36) may be consolidated into a single controller. Further, in other examples, other controllers may be responsible for controlling the converters 100, 200 and brake chopper 300.

Referring to FIG. 5, the electric drive system 12 may have more than one generator 14 or more than one traction motor 16, each coupled electrically to the bus 20 (as indicated in FIG. 1 by the pluralizer "(s)"). As such, the electric drive system 12 may have only one generator 14 and multiple traction motors 16, multiple generators and only one traction motor 16, or multiple generators 14 and multiple traction motors 16. In the case of multiple generators 14, the generators 14 may be arranged in parallel to one another between the power source 23 and the bus 20. In the case of multiple motors 16, the motors 16 may be arranged in parallel between the bus 20 and the ground. Each generator 14 may be configured to operate in the generating and the motoring modes, and each motor 16 may be configured to operate in the motoring and braking modes.

The control unit 22 may have a separate generator controller 42 for each generator 14 and a separate motor controller 52 for each motor 16. In such a case, there may be a respective power converter 100 under the control of the respective generator controller 42 and a respective power converter 200 under the control of the respective motor controller 52.

The PWM control scheme 600 may be modified to account for additional generators and motors. The respective controller 42, 52 may calculate the predicted power of the respective generator 14 or motor 16 in the respective predicted power section 630 or 730, and provide that information to a managing controller.

One of the controllers 42, 52 may be configured as the managing controller having overall responsibility for managing performance of the brake resistor control scheme. The managing controller may perform the hysteretic control scheme 500 and the PWM control scheme 600 except the predicted power sections 630, 730 to which one of the other controllers 42, 52 has been assigned.

The brake resistor control scheme may use only one voltage sensor 54 of the control unit 22. This voltage sensor 54 may be included in one of the generator or motor controllers 42, 52, such as the managing controller, or may be a stand-alone voltage sensor. Although the brake resistor control scheme may use only one voltage sensor 54, it is contemplated that each controller 42, 52 may have a respective voltage sensor 54 associated with it, either included in the controller 42, 52 or as a stand-alone voltage sensor.

If there are multiple motors 16, the routine 600 may have a predicted motor power section 630 for each motor 16, with each such section 630 feeding its predicted motor power $P_{mot}$ to step 670. Each motor controller 52 may perform the section 630 associated with its respective motor 16. There may be a motor speed sensor 60 for each motor 16. Each such motor speed sensor 60 may be positioned to sense the motor speed $s_{mot}$ of the output shaft of the respective motor 16 and may be coupled electrically to the respective motor controller 52 to provide such information thereto.

Referring to FIG. 6, if there are multiple generators 14, the routine 600 may have a corresponding predicted generator power section 730 for each applicable generator 14, i.e., each generator 14 except the first generator 14 (there would not be a predicted generator power section 730 for the first generator 14), with the respective generator controller 42 performing that section 730.

In the predicted generator power section 730 for each applicable generator 14, the respective generator controller 42 may determine the predicted generator power $P_{gen}$ dependent on a generator torque setpoint ($\tau_{gen}$) at which the generator 14 is commanded to operate by that generator controller 42, the actual speed of the shaft of the generator 14 or an indication thereof such as the rotational speed of a shaft of the engine 24 ("actual generator speed" or "$s_{gen}$"), and an efficiency ($\eta_{gen}$) (which may be referred to as "gain") at which the generator 14 converts mechanical energy into electric energy. The respective generator controller 42 may calculate the predicted generator power according to the equation: $P_{gen}=(\tau_{gen})(s_{gen})(\eta_{gen})$. Regarding the sign convention which may be used in the above-mentioned equation for each $P_{gen}$, the generator torque setpoint $\tau_{gen}$ may be positive in the generating mode and negative in the motoring mode of the generator 14.

In step 732, the generator controller 42 for each applicable generator 14 may determine the generator torque setpoint $\tau_{gen}$ of that generator 14, dependent on the DC bus voltage command from the transmission controller 36. The generator controller 42 for the first generator 14 may also determine the generator torque setpoint $\tau_{gen}$ of that generator 14, dependent on the DC bus voltage command from the transmission controller 36, but not as part of the PWM control scheme 600.

For purposes of the PWM control scheme, the vehicle 10 may have a generator speed sensor 62 for each applicable generator 14. Each sensor 62 may be positioned to sense the $s_{gen}$ of the respective generator 14 (e.g., positioned to sense the rotational speed of the generator shaft or an engine shaft) and may be coupled electrically to the respective generator controller 42 to provide such information thereto.

In step 734, the generator controller 42 for each applicable generator 14 may receive the $s_{gen}$ from the respective sensor 62. In step 736, the generator controller 42 may multiply the generator torque setpoint $\tau_{gen}$ and the generator speed $s_{gen}$. In step 738, the generator controller 42 may multiply this product by the efficiency $\eta_{gen}$, resulting in the predicted generator power $P_{gen}$ for that generator 14.

Referring back to FIG. 5, the desired power consumption DPC may thus be dependent on the power difference $P_{diff}$ and the predicted motor powers and the predicted generator powers according to the equation:

$$DPC = P_{diff} - \sum_{1}^{n} Pmot + \sum_{2}^{m} Pgen,$$

wherein "n" is the number of motors 16, and "m" is the number of generators 14. The "−" and the "+" are based on the above-identified sign conventions for the generators 14 and the motors 16. It is understood that a different sign convention could be employed, so long as supplying energy to the bus 20 and removing energy from the bus 20, whether by a generator 14 or a motor 16, are accounted for in a consistent manner.

In the case of multiple traction motors 16, the vehicle 10 may have a drive mechanism 32 coupled respectively to each motor 16, as indicated in FIG. 1. Each drive mechanism 32 may have a traction element (e.g., a wheel) and a final drive coupled mechanically to the respective motor 16 and the traction element so as to provide a fixed gear reduction between the motor 16 and the traction element. In the case of a four-wheel drive loader, there may thus be a motor 16 for each of the four wheels.

In the first example of the control unit 22, one of the motor controllers 52 may be the managing controller and may be coupled electrically to the IGBT 304-2 of the brake chopper 300 to control operation of the brake chopper 300 and the brake resistor 18 thereof. In the second example of the control unit 22, one of the generator controllers 42 may be the managing controller and may be coupled electrically to the IGBT 304-2 of the brake chopper 300 to control operation of the brake chopper 300 and the brake resistor 18 thereof. It is to be understood that other controller layouts may be used for the control unit 22.

In either example of the control unit 22, the controllers 42, 52 may be coupled electrically to a communication bus (e.g., CAN bus) along with the transmission controller 36. In addition, in either example, such as in the second example, there may be a high-speed communication interface (e.g., CAN bus or other suitable high-speed connection) just between the generator and motor controllers 42, 52, as indicated by the dashed line therebetween in FIG. 2, allowing communication between the controllers 42, 52. In this way, even though the generator controller 42 may have direct control over the brake chopper 300 and the brake resistor 18 thereof, the motor controller 52 may exercise control over the brake chopper 300 and the brake resistor 18 thereof via the generator controller 42. It is to be understood that other controller layouts may be used for the control unit 22, including, for example, consolidating the controllers 42, 52 (and even the transmission controller 36) into a single controller.

If there are multiple generators 14, one of the generator controllers 42 may have overall responsibility for performing the closed-loop voltage control scheme (e.g., PI-based voltage control) of the voltage of the DC bus 20 to try to maintain the actual bus voltage nominally at the nominal DC bus voltage. In such a case, to perform the closed-loop voltage control, that generator controller 42 may receive the voltage command from the transmission controller 36 representing the nominal DC bus voltage at which to maintain the bus voltage nominally and voltage readings of the bus voltage. It may also receive speed readings from its associated generator speed sensor 62. Based on the closed-loop voltage control scheme and such speed readings, that generator controller 42 may command operation of the other generator controller(s) 42 and its own generator 14 to try to achieve the nominal DC bus voltage. It may command the other generator controller(s) 42 by issuing them a torque command (or electric current command representative of torque), which could be modified individually by such other generator controller(s) 42 as needed (e.g., to address generator overheating). That generator controller 42 may be the managing controlling responsible for managing performance of the brake resistor control scheme, in which case it may perform the brake resistor control scheme as well. Otherwise, that generator controller 42 may communicate with the managing controller as needed.

The brake resistor control scheme promotes energy efficiency through optimization of brake resistor usage. It does so by offering the opportunity to operate the brake resistor at an intermediate brake duty rather than only constant ON and constant OFF. The brake resistor control scheme may take into account the estimated power available from the bus 20 relative to a non-zero reference power of the bus 20 and the power predicted to be applied to the bus 20 by the motor(s) 16 and any additional generator(s) (i.e., the generators other than the first generator). Such predictive capability enhances the sensitivity of the brake resistor control scheme, further promoting energy efficiency. The brake duty control scheme may offer such optimized usage of the brake resistor 18 during, for example, transmission shifting and vehicle direction reversal. It is thought that such optimization may enhance the fuel economy of the vehicle 10 and may prevent or otherwise reduce a risk of over-voltage in the system 12.

In an alternative embodiment of the controllers 42, 52, each generator and motor controller 42, 52 may include a field-programmable gate array ("FPGA") (not shown). In such a case, the FPGA of each controller 52, 52 may be coupled electrically to the microprocessor 46 and memory 48 of that controller 42, 52 (the microprocessor 46 and the memory 48 being coupled electrically to one another), and the gate drivers 44 and the voltage sensor 54 of that controller 42, 52 may be coupled electrically to the FPGA instead of the microprocessor 46 such that the gate drivers 44 are under the control of the FPGA and the FPGA receives the voltage readings from the voltage sensor 54. The voltage command from the transmission controller 36 may be received by microprocessor 46 in the first example of the control unit 22 and by the FPGA in the second example of the control unit 22. Speed readings from the motor and generator speed sensors 60, 62 may be received by the FPGA in the first example of the control unit 22 and by the microprocessor 46 in the second example of the control unit 22.

The microprocessor 46 may perform a number of functions. For example, the microprocessor 46 may manage the CAN communications with the respective controller 42, 52. With respect to control of the gate drivers 44 associated with the power converters 100, 200, the microprocessor 46 may perform the pulse-width-modulation control scheme for such gate drivers 44 (e.g., space-vector modulation). The microprocessor 46 of the applicable generator controller 42 may perform the PI-based voltage control of the actual bus voltage.

The FPGA and microprocessor 46 of the applicable controller 42, 52 may cooperate to perform the brake resistor control scheme. The FPGA may perform the hysteretic control scheme 500. The microprocessor 46 may calculate the brake duty within the PWM control scheme 600. The FPGA may control operation of the brake resistor 18 by generating an on/off signal for the applicable gate driver 44 according to such calculated brake duty.

It is to be understood that the generator(s), the traction motor(s), the brake resistor, and the bus disclosed herein are, respectively, an electric generator(s), an electric traction motor(s), an electric brake resistor, and an electric bus.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the brake duty is constant OFF if an actual voltage of the bus ("actual bus voltage") is less than a predetermined lower bus voltage and is constant ON if the actual bus voltage is greater than a predetermined upper bus voltage, and is intermediate constant OFF and constant ON if the actual bus voltage is between the predetermined lower bus voltage and the predetermined upper bus voltage.

2. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the control unit is configured to determine the desired power consumption dependent on a difference between an estimated power available from the bus and a non-zero reference power of the bus ("power difference" or "$P_{diff}$"), and a motor power predicted to be applied to the bus by the traction motor ("predicted motor power" or "$P_{mot}$") according to the equation: DPC=$P_{diff}$−$P_{mot}$, such that, with respect to the predicted motor power, supply of electric power to the bus is negative and removal of electric power is positive.

3. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the control unit is configured to determine the desired power consumption dependent on a difference between an estimated power available from the bus and a non-zero reference power of the bus.

4. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the control unit is configured to determine the desired power consumption dependent on an actual voltage of the bus, a non-zero reference voltage of the bus, and a capacitance of a DC link capacitor coupled electrically to the bus.

5. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the control unit is configured to determine the desired power consumption dependent on a motor power predicted to be applied to the bus by the traction motor ("predicted motor power").

6. The electric drive system of claim 5, wherein the control unit is configured to determine the predicted motor power dependent on a motor torque setpoint of the traction motor and a rotational speed of the traction motor.

7. An electric drive system, comprising:
a generator,
a traction motor,
a brake resistor,
a bus, the generator, the traction motor, and the brake resistor coupled electrically to the bus, and
a control unit configured to determine a pulse-width-modulation duty cycle for the brake resistor ("brake duty") and control operation of the brake resistor according to the brake duty, wherein the brake duty can be a value intermediate of constant OFF and constant ON, and the control unit is configured to determine the brake duty dependent on an amount of power desired to be consumed by the brake resistor ("desired power consumption" or "DPC") and a power consumption capacity of the brake resistor ("PCC") according to the equation: brake duty=DPC/PCC, wherein the control unit is configured to determine the power consumption capacity of the brake resistor dependent on an actual voltage of the bus and a resistance of the brake resistor.

8. A method of operating an electric drive system, the electric drive system comprising a generator, a traction motor, a brake resistor, and a bus, the generator, the traction motor, and the brake resistor coupled electrically to bus, the method comprising:
determining a pulse-width-modulation duty cycle for the brake resistor ("brake duty"), and
controlling operation of the brake resistor according to the brake duty, wherein the brake duty can be a value intermediate of constant OFF and constant ON, and determining the brake duty comprises determining an amount of power desired to be consumed by the brake resistor ("desired power consumption" or "DPC") and a power consumption capacity of the brake resistor ("PCC") according to the equation: brake duty=DPC/PCC, wherein determining the desired power consumption comprises determining a difference between an estimated power available from the bus and a non-zero reference power of the bus ("power difference" or "$P_{diff}$"), and a motor power predicted to be applied to the bus by the traction motor ("predicted motor power" or "$P_{mot}$") according to the equation: DPC=$P_{diff}$-$P_{mot}$, such that, with respect to the predicted motor power, supply of electric power to the bus is negative and removal of electric power is positive.

9. A method of operating an electric drive system, the electric drive system comprising a generator, a traction motor, a brake resistor, and a bus, the generator, the traction motor, and the brake resistor coupled electrically to the bus, the method comprising:
determining a pulse-width-modulation duty cycle for the brake resistor ("brake duty"), and
controlling operation of the brake resistor according to the brake duty, wherein the brake duty can be a value intermediate of constant OFF and constant ON, and determining the brake duty comprises determining an amount of power desired to be consumed by the brake resistor ("desired power consumption" or "DPC") and a power consumption capacity of the brake resistor ("PCC") according to the equation: brake duty=DPC/PCC, wherein determining the desired power consumption comprises determining a difference between an estimated power available from the bus and a non-zero reference power of the bus.

10. A method of operating an electric drive system, the electric drive system comprising a generator, a traction motor, a brake resistor, and a bus, the generator, the traction motor, and the brake resistor coupled electrically to the bus, the method comprising:
determining a pulse-width-modulation duty cycle for the brake resistor ("brake duty"), and
controlling operation of the brake resistor according to the brake duty, wherein the brake duty can be a value intermediate of constant OFF and constant ON, and determining the brake duty comprises determining an amount of power desired to be consumed by the brake resistor ("desired power consumption" or "DPC") and a power consumption capacity of the brake resistor ("PCC") according to the equation: brake duty=DPC/PCC, wherein determining the desired power consumption comprises determining the desired power consumption dependent on an actual voltage of the bus, a non-zero reference voltage of the bus, and a capacitance of a DC link capacitor coupled electrically to the bus.

11. A method of operating an electric drive system, the electric drive system comprising a generator, a traction motor, a brake resistor, and a bus, the generator, the traction motor, and the brake resistor coupled electrically to the bus, the method comprising:
determining a pulse-width-modulation duty cycle for the brake resistor ("brake duty"), and
controlling operation of the brake resistor according to the brake duty, wherein the brake duty can be a value intermediate of constant OFF and constant ON, and determining the brake duty comprises determining an amount of power desired to be consumed by the brake resistor ("desired power consumption" or "DPC") and a power consumption capacity of the brake resistor ("PCC") according to the equation: brake duty=DPC/PCC, wherein determining the desired power consumption comprises determining a motor power predicted to be applied to the bus by the traction motor ("predicted motor power").

12. The method of claim 11, wherein determining the predicted motor power comprises determining the predicted motor power dependent on a motor torque setpoint of the traction motor and a rotational speed of the traction motor.

13. A method of operating an electric drive system, the electric drive system comprising a generator, a traction motor, a brake resistor, and a bus, the generator, the traction motor, and the brake resistor coupled electrically to the bus, the method comprising:
determining a pulse-width-modulation duty cycle for the brake resistor ("brake duty"), and
controlling operation of the brake duty resistor according to the brake duty, wherein the brake duty can be a value intermediate of constant OFF and constant ON, and determining the brake duty comprises determining an amount of power desired to be consumed by the brake resistor ("desired power consumption" or "DPC") and a power consumption capacity of the brake resistor ("PCC") according to the equation: brake duty=DPC/PCC, wherein determining the power consumption capacity of the brake resistor comprises determining the power consumption capacity dependent on an actual voltage of the bus and a resistance of the brake resistor.

* * * * *